US009582004B2

(12) United States Patent
Rothoff et al.

(10) Patent No.: US 9,582,004 B2
(45) Date of Patent: Feb. 28, 2017

(54) APPARATUS AND METHOD FOR PREDICTION OF TIME AVAILABLE FOR AUTONOMOUS DRIVING, IN A VEHICLE HAVING AUTONOMOUS DRIVING CAPABILITIES

(71) Applicant: VOLVO CAR CORPORATION, Gothenburg (SE)

(72) Inventors: Marcus Nils Gunnar Rothoff, Gothenburg (SE); Erik Coelingh, Alvangen (SE); Anders Tylman-Mikiewicz, Gothenburg (SE); Douglas Hall Frasher, Newbury Park, CA (US); Per Rodjer, Billdal (SE); Jesper Andreasson, Camarillo, CA (US); Jonas Soderqvist, Camarillo, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/633,462

(22) Filed: Feb. 27, 2015

(65) Prior Publication Data
US 2015/0253778 A1 Sep. 10, 2015

(30) Foreign Application Priority Data

Mar. 4, 2014 (EP) .................................... 14157576

(51) Int. Cl.
*G05D 1/00* (2006.01)
*G05D 1/02* (2006.01)
(Continued)

(52) U.S. Cl.
CPC ........... *G05D 1/0214* (2013.01); *B60W 30/12* (2013.01); *B60W 30/16* (2013.01); *B60W 50/14* (2013.01);
(Continued)

(58) Field of Classification Search
CPC .... G05D 1/0088; G05D 1/021; G05D 1/0214; B60W 50/082; B60W 50/14;
(Continued)

(56) References Cited

U.S. PATENT DOCUMENTS 4,486,694 A * 12/1984 Ohba ................... G05D 1/0265
180/168
5,774,069 A 6/1998 Tanaka et al.
(Continued)

FOREIGN PATENT DOCUMENTS

DE 10 2011 082375 A1 3/2013
DE 102011082375 3/2013
(Continued)

OTHER PUBLICATIONS

Extended European Search Report for European Application No. 14157576.1, Completed by the European Patent Office, Dated Jul. 7, 2014, 6 Pages.

(Continued)

*Primary Examiner* — Atul Trivedi
(74) *Attorney, Agent, or Firm* — Brooks Kushman P.C.

(57) ABSTRACT

Provided are a method and an apparatus for prediction of time available for autonomous driving, in a vehicle having autonomous driving capabilities and including at least one remote sensor configured to acquire vehicle surrounding information and at least one vehicle dynamics sensor configured to determine vehicle dynamics parameters. The method and apparatus include at least one of a positioning arrangement that provides map data with associated information, a route planning arrangement that enables route planning, and a real time information acquiring arrangement that acquires at least one of real time traffic information and real time weather information. The time available is calculated based on a planned route and at least one of vehicle (Continued)

surrounding information, vehicle dynamics parameters, map data with associated information, real time traffic information and real time weather information, for the planned route. The calculated time is output to a human machine interface in a vehicle.

7 Claims, 3 Drawing Sheets

(51) Int. Cl.
*B60W 50/14* (2012.01)
*B60W 30/12* (2006.01)
*B60W 30/16* (2012.01)
*B60W 50/08* (2012.01)

(52) U.S. Cl.
CPC ......... *G05D 1/0061* (2013.01); *G05D 1/0088* (2013.01); *B60W 50/082* (2013.01); *B60W 2050/146* (2013.01); *B60W 2550/10* (2013.01); *B60W 2550/12* (2013.01); *B60W 2550/22* (2013.01); *B60W 2550/30* (2013.01); *G05D 2201/0213* (2013.01)

(58) Field of Classification Search
CPC .. B60W 30/12; B60W 30/16; B60W 2550/10; B60W 2550/12; B60W 2550/22; B60W 2550/30; B60W 2050/146
USPC ...................................................... 701/23, 25
See application file for complete search history.

(56) References Cited

U.S. PATENT DOCUMENTS

| | | | |
|---|---|---|---|
| 7,979,172 B2* | 7/2011 | Breed ................... | G08G 1/161 701/117 |
| 8,260,482 B1 | 9/2012 | Szybalski et al. | |
| 8,433,470 B1 | 4/2013 | Szybalski et al. | |
| 8,718,861 B1* | 5/2014 | Montemerlo ............ | G05D 1/00 701/26 |
| 8,825,259 B1* | 9/2014 | Ferguson ............. | G05D 1/0214 104/124 |
| 8,849,494 B1* | 9/2014 | Herbach ............... | B60W 30/00 701/24 |
| 8,996,224 B1* | 3/2015 | Herbach .............. | G05D 1/0011 180/116 |
| 9,134,731 B2* | 9/2015 | Healey ................. | B60W 30/00 |
| 9,182,764 B1* | 11/2015 | Kolhouse ............. | G05D 1/0293 |
| 2008/0027599 A1* | 1/2008 | Logan ................ | G05D 1/0234 701/23 |
| 2008/0161986 A1* | 7/2008 | Breed ................... | G08G 1/161 701/23 |
| 2008/0161987 A1* | 7/2008 | Breed ................... | G08G 1/161 701/27 |
| 2009/0037033 A1* | 2/2009 | Phillips ................ | G05D 1/0088 701/2 |
| 2010/0256835 A1* | 10/2010 | Mudalige ................ | G08G 1/22 701/2 |
| 2010/0256836 A1* | 10/2010 | Mudalige ................ | G08G 1/22 701/2 |
| 2011/0184605 A1* | 7/2011 | Neff ..................... | G05D 1/0255 701/25 |
| 2012/0046819 A1 | 2/2012 | Agrawal et al. | |
| 2012/0197464 A1* | 8/2012 | Wang .................... | B25J 9/1689 701/2 |
| 2012/0316725 A1 | 12/2012 | Trepagnier et al. | |
| 2013/0211656 A1* | 8/2013 | An ........................ | G05D 1/0221 701/25 |
| 2014/0136414 A1* | 5/2014 | Abhyanker ............ | G06Q 50/28 705/44 |
| 2014/0156134 A1* | 6/2014 | Cullinane ............. | B60W 30/00 701/23 |
| 2015/0032322 A1 | 1/2015 | Wimmer et al. | |
| 2015/0051781 A1 | 2/2015 | Schnieders et al. | |
| 2015/0149017 A1* | 5/2015 | Attard .................. | B60W 30/182 701/23 |
| 2015/0202770 A1* | 7/2015 | Patron .................... | G05D 1/024 700/245 |
| 2015/0203107 A1* | 7/2015 | Lippman ............... | B60W 30/00 701/23 |
| 2015/0248131 A1* | 9/2015 | Fairfield .............. | G05D 1/0044 701/2 |
| 2015/0309512 A1* | 10/2015 | Cudak .................. | G05D 1/0287 701/23 |
| 2015/0323932 A1* | 11/2015 | Paduano ................ | G05D 1/042 701/3 |
| 2015/0346718 A1* | 12/2015 | Stenneth ............ | G06Q 30/0611 701/2 |
| 2015/0346727 A1* | 12/2015 | Ramanujam ....... | B62D 15/0285 701/23 |
| 2015/0370251 A1* | 12/2015 | Siegel .................. | G05D 1/0027 701/2 |

FOREIGN PATENT DOCUMENTS

| | | |
|---|---|---|
| DE | 102012002306 | 8/2013 |
| DE | 102012016802 | 2/2014 |
| DE | 10 2013 008605 A1 | 11/2014 |
| EP | 2314490 | 4/2011 |
| WO | 2010131102 | 11/2010 |
| WO | 2013034347 | 3/2013 |
| WO | 2014139821 A1 | 9/2014 |
| WO | 2014191657 A1 | 12/2014 |

OTHER PUBLICATIONS

Website XP 002685537, Youtube Video Uploaded on Jul. 29, 2011, Retrieved from the Internet on Jun. 22, 2015, 3 Pages, "Autopilot Driving—EU Research project/Volkswagen Car" https://www.youtube.com/watch?v=XIMLUI6WPoU.

Website XP 002685503, Internet Article Dated Jun. 23, 2011, Google Machine Translation attached to orignal articlem, All together 7 Pages, Retrieved from the Internet on Jun. 22, 2015, "Research project: traveling and driving the car at the request almost automatically with TAP, The temporary autopilot Volkswagen." http://www.heise.de/autos/artikel/Der-temporaere-Autopilot-von-Volkswagen-1268480.html.

Extended European Search Report for European Application No. 14157579.5, completed by the European Patent Office, dated Aug. 13, 2014, 5 pages.

U.S. non-final Office Action for U.S. Appl. No. 14/629,805, completed by the U.S. Patent and Trademark Office, dated Jul. 20, 2016, 13 pages.

U.S. non-final Office Action for U.S. Appl. No. 14/629,805, completed by the U.S. Patent and Trademark Office, dated Jan. 25, 2016, 22 pages.

Notice of Allowance and Fees Due, for U.S. Appl. No. 14/629,805, completed by the U.S. Patent and Trademark Office, dated Nov. 3, 2016.

* cited by examiner

APPARATUS AND METHOD FOR PREDICTION OF TIME AVAILABLE FOR AUTONOMOUS DRIVING, IN A VEHICLE HAVING AUTONOMOUS DRIVING CAPABILITIES

CROSS-REFERENCE TO RELATED APPLICATIONS

This application claims foreign priority benefits under 35 U.S.C. §119(a)-(d) to European Patent Application Number EP 14157576.1, filed Mar. 4, 2014, which is incorporated by reference in its entirety.

TECHNICAL FIELD

Embodiments herein relate to an apparatus and method for prediction of time available for autonomous driving, in a vehicle having autonomous driving capabilities as well as an automotive vehicle having autonomous driving capabilities that comprises such an apparatus.

BACKGROUND

One area of automotive vehicle technology that is evolving rapidly is the area of autonomous or semi-autonomous drive capabilities. This is enabled through the introduction of sensors, for sensing vehicle parameters and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means the driver is not required to perform maneuvers, the vehicle usually is dependent on multiple data sources as inputs to perform the autonomous driving, such as detection of surrounding vehicles, traffic lanes, obstacles, data from navigation systems and so on. However, should one or more of these inputs not be available, there might not be sufficient information to perform autonomous driving. In such cases a driver-hand over may be requested in order to ensure road safety.

A previous document, U.S. Pat. No. 8,433,470, relates to a user interface for displaying an internal state of an autonomous driving system. In the event of an emergency situation identified by a control computer of the automated vehicle, it may immediately convey this information to a passenger in a variety of ways. For example, if the control computer is no longer able to control the vehicle safely, illuminated indicators may change color, to inform the user of the immediate need to take control of the steering wheel. The control computer may also send audio alerts to the passenger stating that there is an emergency and the passenger is required to take control of the steering wheel. The control computer may further use cameras to scan the passenger's eyes and/or other features. If the control computer determines that the eyes are closed or the body is slumped over (e.g. the passenger is sleeping or under the influence of drugs or alcohol), the control computer may take emergency control of the vehicle and use audible alerts to wake or otherwise get the attention of the driver.

However, during autonomous driving a vehicle driver may desire to use the time when the vehicle runs in autonomous mode, and the driver is not required to perform maneuvers, to perform other activities, e.g. resting, reading, watching a movie or similar. Being otherwise occupied will, depending on the circumstances, of course affect the vehicle driver's readiness to respond to a request to assume manual control of the vehicle.

Another previous document, U.S. Pat. No. 5,774,069, relates to an auto-drive control unit which can switch a vehicle provided with an auto-drive mode from the auto-drive mode to a manual drive mode at a desired point. The scheduled location (desired point) where the vehicle is to run in the manual drive is assumed to be a safety zone of the auto-drive lane, such as an interchange. Based on detection signals from various types of sensors, an auto-drive controller controls an actuator to perform auto-drive. A changeover switch is provided to switch between the auto-drive and manual drive. When the vehicle is running in the auto-drive mode, the current position of the vehicle is continuously detected on the basis of a signal from a GPS, and the vehicle speed is checked according to a signal from a vehicle speed sensor. After checking the location and the vehicle speed, an expected time of arrival at the destination, namely the scheduled location (desired point) where the drive should be changed to the manual drive, is calculated according to such data. According to a shifting time to complete the shift to the manual drive, timing for operating the changeover switch is determined, and a message is shown on a warning display to urge a driver to operate the switch. In one embodiment, it is judged in view of a prescribed shifting time whether or not the shift from the auto-drive mode to the manual drive mode can be completed before the vehicle has reached a destination and an appropriate measure is taken according to the judged result, so that the changeover to the manual drive can be made reliably at the desired point.

However, although alerting the driver in time, so that the changeover to the manual drive can be made reliably the message shown on the warning display urging the driver to operate the changeover switch will potentially catch an otherwise occupied driver off guard and thus affect the vehicle driver's readiness to respond to the request to assume manual control of the vehicle.

SUMMARY

Embodiments herein aim to provide an improved apparatus for prediction of time available for autonomous driving, in a vehicle having autonomous driving capabilities, the vehicle comprising: at least one remote sensor configured to acquire vehicle surrounding information; and at least one vehicle dynamics sensor configured to determine vehicle dynamics parameters, providing to a driver of the vehicle improved capabilities for planning and utilizing the time when the vehicle runs in autonomous mode, and the driver is not required to perform vehicle control maneuvers.

This is provided through an apparatus that further comprises at least one of: a positioning arrangement configured to provide map data with associated speed limit and road infrastructure information; a route planning arrangement; and an arrangement for acquiring real time information, including at least one of real time traffic information and real time weather information, and further: a processor configured to calculate a time available for autonomous driving based on a planned route and at least one of vehicle surrounding information, vehicle dynamics parameters, map data with associated speed limit and infrastructure information, real time traffic information and real time weather information, associated with the planned route; and a human machine interface configured to output to a vehicle passenger compartment the calculated time available for autonomous driving along the planned route.

The provision of a calculated time available for autonomous driving and a human machine interface configured to output to a vehicle passenger compartment this calculated time available for autonomous driving along the planned route enables a driver of the vehicle to confidently use the time available during autonomous driving and plan the activities that are possible during the drive in such a way that the driver is prepared to respond to a request to assume manual control of the vehicle at the expiry of this calculated time available for autonomous driving.

According to a second aspect is provided that the processor further is configured to calculate a hand over time, required for hand over from autonomous driving to manual driving, and to include this calculated hand over time in the calculation of time available for autonomous driving.

The provision of including the calculated hand over time in the calculation of time available for autonomous driving further ensures that the time available for autonomous driving cannot be less than the time required for hand over from autonomous driving to manual driving, thus ensuring that the vehicle driver does not suffer a stressful and potentially dangerous transition to manual driving.

According to a third aspect is provided that the processor is configured to calculate the time available for autonomous driving based on at least road infrastructure information, real time traffic information and real time weather information.

The provision of calculating the time available for autonomous driving based on at least road infrastructure information, real time traffic information and real time weather information forms a comprehensive basis for performing an adequate calculation of the time available for autonomous driving.

According to a fourth aspect is provided that the processor further is configured to calculate the time available for autonomous driving based on certified road sections allowed to drive autonomously on.

The provision of calculating the time available for autonomous driving based on certified road sections allowed to drive autonomously on forms a proven basis for performing an adequate calculation of the time available for autonomous driving.

According to a fifth aspect is provided that the arrangement for acquiring real time information, when present, comprises an interface for communication via one or more portable communication devices of vehicle occupants for acquiring the real time information.

The provision of an interface for communication via one or more portable communication devices of vehicle occupants for acquiring the real time information enables either the realization of a less complex and more cost effective apparatus or alternatively the provision of a redundant back-up channel for acquiring the real time information.

According to a sixth aspect is provided that the arrangement for acquiring real time information, when present, comprises an interface for performing at least one of vehicle-to-vehicle and vehicle-to-infrastructure communication for acquiring the real time information.

The provision of an interface for performing at least one of vehicle-to-vehicle and vehicle-to-infrastructure communication for acquiring the real time information enables the realization of an effective apparatus for acquiring real time information which is highly relevant for the current surroundings.

Further embodiments herein aim to provide a method for prediction of time available for autonomous driving, in a vehicle having autonomous driving capabilities, the vehicle comprising: at least one remote sensor configured to acquire vehicle surrounding information; and at least one vehicle dynamics sensor configured to determine vehicle dynamics parameters.

This is provided through a method comprising at least on of the steps of: providing map data with associated speed limit and road infrastructure information using a positioning arrangement; performing route planning using a route planning arrangement; and acquiring real time information, including at least one of real time traffic information and real time weather information, and the steps of: calculating, using a processor, a time available for autonomous driving based on a planned route and at least one of vehicle surrounding information, vehicle dynamics parameters, map data with associated speed limit and infrastructure information, real time traffic information and real time weather information, associated with the planned route; and outputting to a human machine interface configured in a vehicle passenger compartment the calculated time available for autonomous driving along the planned route.

The provision of calculating a time available for autonomous driving and outputting to a human machine interface configured in a vehicle passenger compartment this calculated time available for autonomous driving along the planned route enables a driver of the vehicle to confidently use the time available during autonomous driving and plan the activities that are possible during the drive in such a way that the driver is prepared to respond to a request to assume manual control of the vehicle at the expiry of this calculated time available for autonomous driving.

According to a final aspect is provided an automotive vehicle having autonomous driving capabilities which comprises an apparatus for prediction of time available for autonomous driving as above.

An automotive vehicle which comprises an apparatus for prediction of time available for autonomous driving configured to calculate a time available for autonomous driving and to output to a vehicle passenger compartment this calculated time available for autonomous driving along the planned route enables a driver of the vehicle to confidently use the time available during autonomous driving and plan the activities that are possible during the drive in such a way that the driver is prepared to respond to a request to assume manual control of the vehicle at the expiry of this calculated time available for autonomous driving.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments of the present disclosure are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
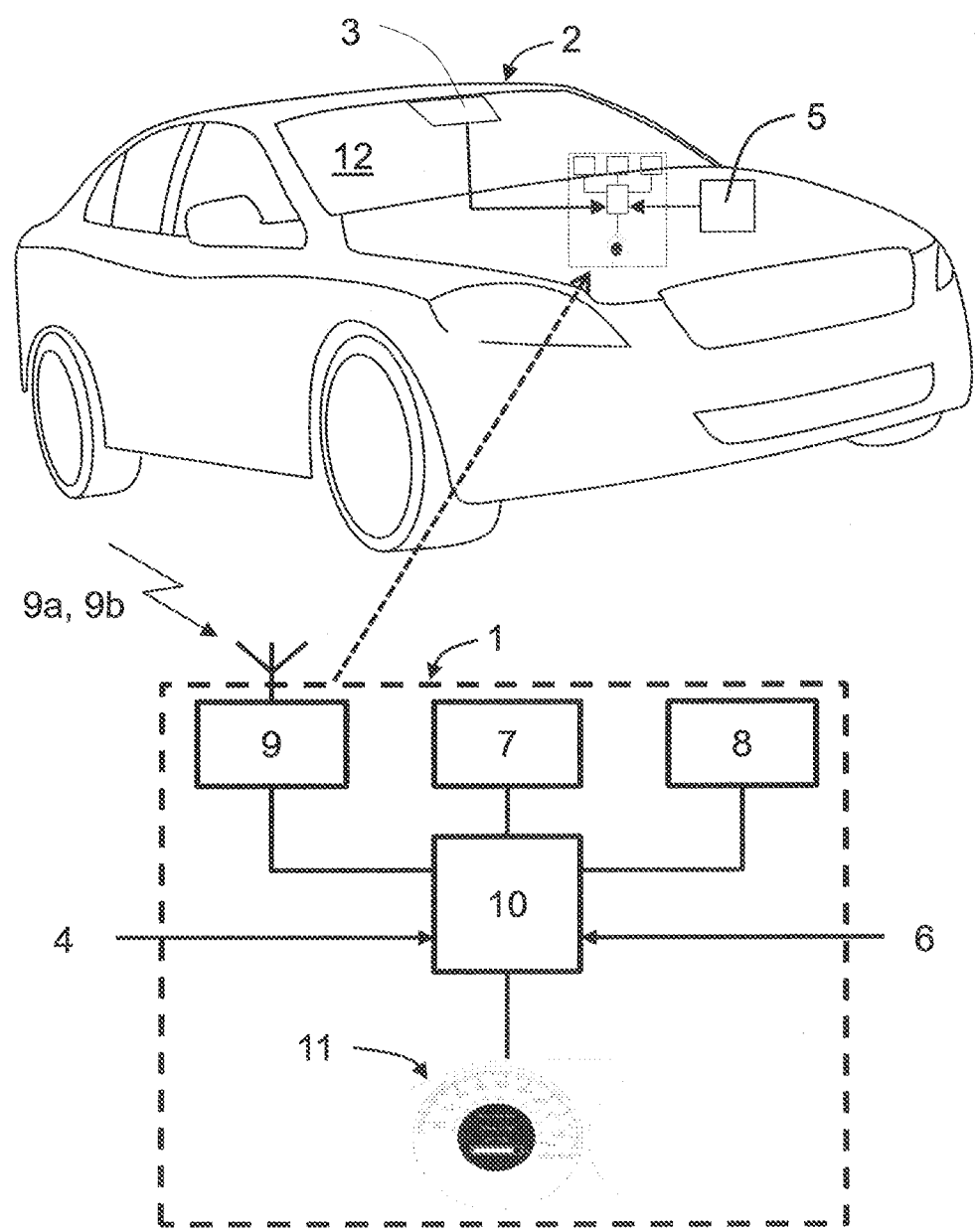
FIG. 1 is a schematic illustration of an apparatus for prediction of time available for autonomous driving, in a vehicle having autonomous driving capabilities according to embodiments herein.

In overview, embodiments herein relate to an apparatus 1 for prediction of time available for autonomous driving in a vehicle 2 having autonomous driving capabilities, the vehicle comprising: remote sensors 3 arranged or configured to acquire vehicle surrounding information 4; and vehicle dynamics sensors 5 arranged or configured to determine vehicle dynamics parameters 6, as illustrated in FIG. 1

A vehicle 2 having autonomous driving capabilities will include a vehicle controller (not shown) for controlling unmanned autonomous driving. The vehicle controller will e.g. pursue a route to a final destination, and control the vehicle 2 so that the vehicle 2 can perform autonomous driving along the route to the final destination in an unmanned manner. Usually, when a fixed or movable obstacle is present in the route to the final destination, the vehicle controller will detect the object, using vehicle remote sensor systems 3 such as one or more of a Radio Detection And Ranging (RADAR) sensor, a Light Detection And Ranging (LIDAR) sensor, a Light Amplification by Stimulated Emission of Radiation (LASER) sensor, an ultrasound sensor, an infrared sensor, an image sensor, or any combination thereof. Thereafter the vehicle controller will control vehicle actuators (not shown), such as steering, braking and throttle actuators, in order to avoid the detected obstacle, or temporarily halt vehicle 2 travel in order to avoid a collision with the detected object.

The autonomous travel vehicle controller may also comprise or be arranged or configured to control sub-systems such as cruise control systems, so-called ACC (Adaptive Cruise Control) systems, which monitor the front area of the vehicle, with the aid of e.g. a radar sensor, and automatically regulate the distance to a preceding vehicle, as well as automatic lane-keeping systems and combinations of such systems.

The apparatus 1 further comprises at least one of: a positioning arrangement 7 arranged or configured to provide map data with associated speed limit and road infrastructure information; a route planning arrangement 8; and an arrangement for acquiring real time information 9, including at least one of real time traffic information 9a and real time weather information 9b.

The positioning arrangement 7, when present, is, as mentioned above, arranged or configured to provide map data with associated speed limit and road infrastructure information. The positioning arrangement may comprise a navigation system, such as a global positioning system (GPS) or equivalent.

The route planning arrangement 8, when present, is provided by the apparatus 1, such that a route to be travelled may be planned by a vehicle 2 driver, a traffic control center, a logistics center or similar. Route planning may be made using an interface (not shown) provided in a vehicle passenger compartment of the vehicle 2 or alternatively via a remote interface (not shown) arranged or configured to communicate with the route planning arrangement, e.g. through a wireless communication network. If a predefined route has been planned more information will be available to the processor 10, thus enabling it to perform a more accurate prediction. If the autonomous driving capability is simply activated on a road travelled, without any knowledge of a planned route, the prediction of possible autonomous driving time will suitably be based on road infrastructure, such as the presence of motorway exits, crossings and other potentially limiting infrastructure elements along the road travelled. In this case the predicted time available for autonomous driving will have to be adapted to allow a driver to take control before next exit in order to be able to make a decision to exit the road or to continue driving thereupon.

The arrangement 9 for acquiring real time information, when present, includes an arrangement for acquiring at least one of real time traffic information 9a and real time weather information 9b.

Further, a processor 10 is arranged or configured to calculate a time available for autonomous driving based on a planned route and at least one of vehicle surrounding information 4, vehicle dynamics parameters 6, map data with associated speed limit and infrastructure information, real time traffic information 9a and real time weather information 9b, associated with the planned route.

Figure 2:
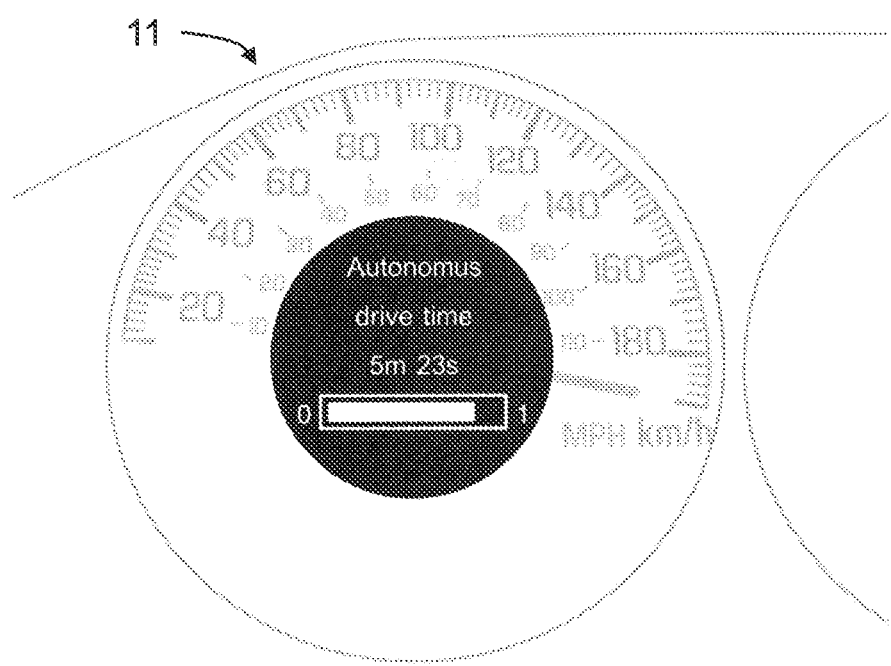
FIG. 2 is a schematic illustration of a human machine interface configured to output to a vehicle passenger compartment a calculated time available for autonomous driving along a planned route according to embodiments herein.

In order to enable a driver of the vehicle 2 to confidently use the time available during autonomous driving, and plan the activities that are possible during the drive, a human machine interface (HMI) 11 is arranged or configured to output to a vehicle 2 passenger compartment 12 the calculated time available for autonomous driving along the planned route. Hereby the driver can confidently plan activities, such as e.g. choosing to start texting a message, check an e-mailbox or start editing a presentation. An example embodiment of such an HMI 11, arranged or configured at the dashboard of a vehicle, is illustrated in FIG. 2. As illustrated, the HMI 11 may be arranged or configured to present the information graphically to a display, e.g. as a count-down clock, here at 5 m 23 s, and/or as a bar or similar graphical element, illustrating in an animated fashion the amount of time remaining until a hand over to manual driver is expected to be required.

Figure 3:
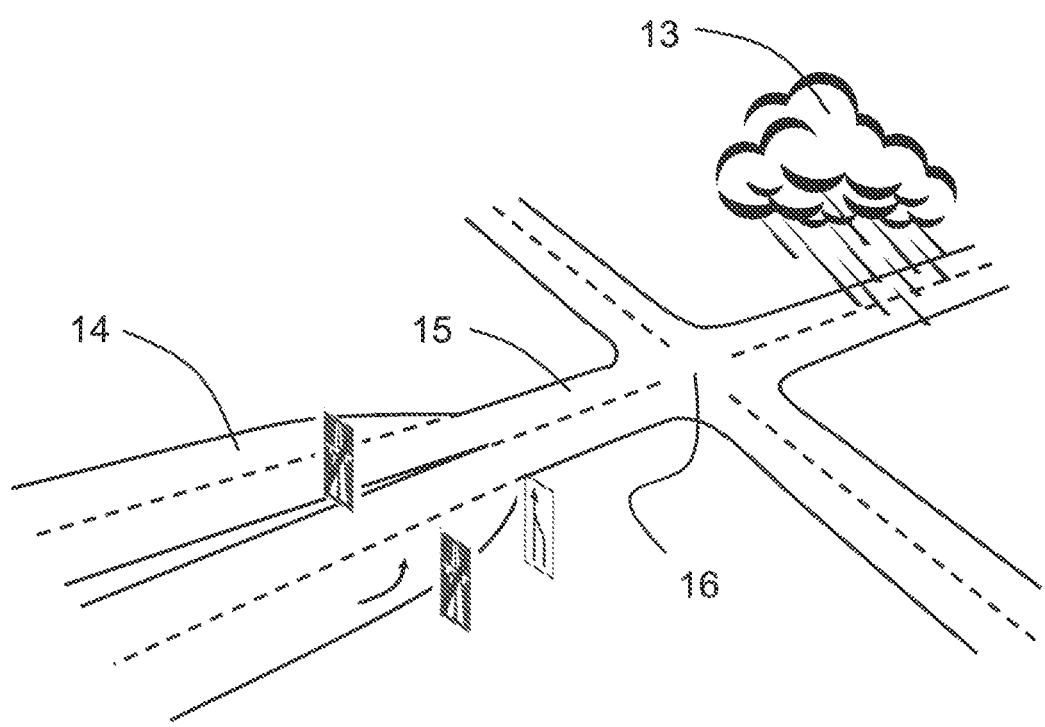
FIG. 3 is a schematic illustration of road infrastructure, traffic and weather conditions along a planned route according to embodiments herein.

As mentioned above, environmental conditions may restrict autonomous driving. FIG. 3 illustrates examples of such restrictions. If heavy rain 13 or snow is present further ahead along the planned route this might be the limiting factor for autonomous driving beyond that point. Typical restricting information for this functionality will be map data with speed limitations and real time traffic information 9a, real time weather information 9b etc., associated with the planned route.

Further, road infrastructure may restrict autonomous driving. For example a multiple lane motorway 14 with no oncoming traffic may end into a two-way traffic road 15 comprising a crossing 16. If a motorway exit or a crossing 16 is present further ahead along the planned route this might be the limiting factor for autonomous driving beyond that point. Typical restricting information for this functionality will be map data with road infrastructure information associated with the planned route.

Thus, the apparatus 1 provide to a driver of the vehicle 2 a prediction of the time available for autonomous driving based on external factors limiting the vehicle's ability to drive by itself.

In embodiments hereof the processor 10 is further arranged or configured to calculate a hand over time, required for hand over from autonomous driving to manual driving, and to include this calculated hand over time in the calculation of time available for autonomous driving. Hereby will be ensured that the time available for autonomous driving cannot be less than the time required for hand over from autonomous driving to manual driving, i.e. the time required for transition from unmanned autonomous travel to manual control of the vehicle 2.

In further embodiments hereof the processor 10 is arranged or configured to calculate the time available for autonomous driving based on at least road infrastructure information, real time traffic information 9a and real time weather information 9b, which form a comprehensive basis for performing an adequate calculation of the time available for autonomous driving.

In other embodiments hereof the processor 10 is further arranged or configured to calculate the time available for autonomous driving based on certified road sections allowed to drive autonomously on, which forms a proven basis for performing an adequate calculation of the time available for autonomous driving. Such certified road sections can e.g. be: road sections with no oncoming traffic, such as motorway road sections; road sections with suitable speed limits, such as maximum allowed autonomous driving speed 50 kph or 70 kph.

In still further embodiments hereof the arrangement for acquiring real time information 9, when present, comprises an interface (not shown) for communication via one or more portable communication devices of vehicle occupants for acquiring the real time information. Such an interface may rely on a wired connection to one or more portable communication devices or alternatively a wireless connection to one or more portable communication devices, e.g. based on WiFi, Bluetooth or similar wireless communication technologies. This enables either the realization of a less complex and more cost effective apparatus 1 or alternatively the provision of a redundant back-up channel for acquiring the real time information 9a, 9b.

In yet further embodiments the arrangement for acquiring real time information 9, when present, comprises an interface (not shown) for performing at least one of vehicle-to-vehicle (V2V) and vehicle-to-infrastructure (V2X) communication for acquiring the real time information. Such an interface will normally rely on suitable wireless communication protocols for communicating with vehicles and infrastructures in relevant vicinity of the vehicle 2 hosting the apparatus 2. This enables the realization of an effective apparatus for acquiring real time information 9 which is highly relevant for the current surroundings.

Further possible boundary conditions for allowing autonomous driving, and thus affecting the prediction of time available for autonomous driving, are: traffic intensity; presence/absence of oncoming traffic; speed limitations; the number of adjacent lanes; information on accidents or road-work further along the planned route, etc.

Other possible boundary conditions could be: a requirement of another vehicle in front (e.g. a requirement of travelling in a queue); only being allowed to stay in the actual lane (i.e. prevented from changing lanes); only allowed to drive on highways (with no oncoming traffic). A possible requirement to have another vehicle in front will depend on real time traffic information. The apparatus 1 may also consider specific events, e.g. accept a short disturbance in a motorways exit, such that if a lead vehicle is required and this lead vehicle leaves the motorway, autonomous driving of the vehicle 2 may still be allowed for a limited section without a lead vehicle ahead. If the availability of potential new lead vehicles is known, motorway exits may not be restricting the predicted autonomous driving time.

If, for example, the boundary conditions for the vehicle 2 are that it is only allowed to drive on highways (with no oncoming traffic) and another vehicle ahead, which it follows, the predicted time available for autonomous driving would normally be the time required for the vehicle 2 to travel to a chosen highway exit, as long as the vehicle ahead (queue) is maintained, i.e. in dense traffic. However, should the real time traffic information 9a indicate that the queue is breaking up, such that it becomes difficult to maintain the requirement of another vehicle ahead, the predicted time available for autonomous driving could be recalculated, e.g. dependent on the speed limit for autonomous driving applying to the road travelled, and an update presented to the vehicle 2 driver via the human machine interface 11.

According to the present application is also envisaged a method for prediction of time available for autonomous driving, in a vehicle 2 having autonomous driving capabilities, the vehicle comprising: remote sensors 3 arranged or configured to acquire vehicle surrounding information 4; and vehicle dynamics sensors 5 arranged or configured to determine vehicle dynamics parameters 5.

Accordingly the proposed method comprises at least one of the steps of:—providing map data with associated speed limit and road infrastructure information using a positioning arrangement 7;—performing route planning using a route planning arrangement 8; and—acquiring real time information, including at least one of real time traffic information 9a and real time weather information 9b, and the steps of:—calculating, using a processor 10, a time available for autonomous driving based on a planned route and at least one of vehicle surrounding information 4, vehicle dynamics parameters 6, map data with associated speed limit and infrastructure information, real time traffic information 9a and real time weather information 9b, associated with the planned route; outputting to a human machine interface 11 arranged or configured in a vehicle 2 passenger compartment 12 the calculated time available for autonomous driving along the planned route.

In accordance with the present application is also envisaged an automotive vehicle 2 having autonomous driving capabilities comprising an apparatus 1 for prediction of time available for autonomous driving as described in the foregoing.

Although the above description mainly describes passenger car vehicles, the teachings provided herein may, without loss of generality, be expanded to consider commercial vehicles, such as buses, trucks and similar vehicles having autonomous driving capabilities, without loss of generality. The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An apparatus for prediction of time available for autonomous driving, in a vehicle having autonomous driving capabilities, the vehicle comprising at least one remote sensor configured to acquire vehicle surrounding information, and at least one vehicle dynamics sensor configured to determine vehicle dynamics parameters, the apparatus comprising:
    at least one of a positioning arrangement configured to provide map data with associated speed limit and road infrastructure information, a route planning arrangement, and an arrangement for acquiring real time information including at least one of real time traffic information and real time weather information;
    a processor configured to calculate a time available for autonomous driving based on a planned route and at least one of vehicle surrounding information, vehicle dynamics parameters, map data with associated speed limit and infrastructure information, real time traffic information and real time weather information, associated with the planned route; and
    a human machine interface configured to output to a vehicle passenger compartment the calculated time available for autonomous driving along the planned route;
    wherein the processor further is configured to calculate a hand over time, required for hand over from autonomous driving to manual driving, and to include the calculating hand over time in the calculation of time available for autonomous driving.

2. The apparatus of claim 1 wherein the processor is configured to calculate the time available for autonomous driving based on at least road infrastructure information, real time traffic information and real time weather information.

3. The apparatus of claim 1 wherein the processor further is configured to calculate the time available for autonomous driving based on certified road sections on which autonomous driving is allowed.

4. The apparatus of claim 1 wherein the arrangement for acquiring real time information, when present, comprises an interface for communication via one or more portable communication devices of vehicle occupants for acquiring the real time information.

5. The apparatus of claim 1 wherein the arrangement for acquiring real time information, when present, comprises an interface for performing at least one of vehicle-to-vehicle and vehicle-to-infrastructure communication for acquiring the real time information.

6. An automotive vehicle having autonomous driving capabilities and comprising an apparatus for prediction of time available for autonomous driving according to claim 1.

7. A method for prediction of time available for autonomous driving, in a vehicle having autonomous driving capabilities, the vehicle comprising at least one remote sensor configured to acquire vehicle surrounding information and at least one vehicle dynamics sensor configured to determine vehicle dynamics parameters, the method comprising:
    at least one of providing map data with associated speed limit and road infrastructure information using a positioning arrangement, performing route planning using a route planning arrangement, and acquiring real time information including at least one of real time traffic information and real time weather information;
    calculating, using a processor, a time available for autonomous driving based on a planned route and at least one of vehicle surrounding information, vehicle dynamics parameters, map data with associated speed limit and infrastructure information, real time traffic information and real time weather information, associated with the planned route, and calculating a hand over time, required for hand over from autonomous driving to manual driving, and including the calculated hand over time in the calculating of time available for autonomous driving; and
    outputting, to a human machine interface arranged in a vehicle passenger compartment, the calculated time available for autonomous driving along the planned route.

* * * * *